(12) United States Patent
Bajema et al.

(10) Patent No.: US 9,014,434 B2
(45) Date of Patent: Apr. 21, 2015

(54) METHOD FOR SCORING AND CONTROLLING QUALITY OF FOOD PRODUCTS IN A DYNAMIC PRODUCTION LINE

(71) Applicant: Frito-Lay North America, Inc., Plano, TX (US)

(72) Inventors: Rick Wendell Bajema, Plano, TX (US); Garrett Fox, Frisco, TX (US); Kevin Matthew Trick, Frisco, TX (US); David Ray Warren, Plano, TX (US); Sheila Wright-Henry, McKinney, TX (US); Sonchai Lange, Plano, TX (US); Wilfred Marcellien Bourg, Jr., Melissa, TX (US)

(73) Assignee: Frito-Lay North America, Inc., Plano, TX (US)

( * ) Notice: Subject to any disclaimer, the term of this patent is extended or adjusted under 35 U.S.C. 154(b) by 156 days.

(21) Appl. No.: 13/684,994

(22) Filed: Nov. 26, 2012

(65) Prior Publication Data
US 2014/0147015 A1 May 29, 2014

(51) Int. Cl.
*G06K 9/00* (2006.01)
*G06T 7/00* (2006.01)

(52) U.S. Cl.
CPC ..... *G06T 7/0004* (2013.01); *G06T 2207/30128* (2013.01)

(58) Field of Classification Search
CPC .................. G06T 7/0004; G06T 2207/30128
See application file for complete search history.

(56) References Cited

U.S. PATENT DOCUMENTS

| | | | |
|---|---|---|---|
| 3,840,931 A | 10/1974 | Bivens | |
| 5,422,831 A * | 6/1995 | Misra et al. | 702/81 |
| 5,887,702 A | 3/1999 | Mott | |
| 6,011,540 A * | 1/2000 | Berlin et al. | 345/601 |
| 6,763,132 B2 | 7/2004 | Freifeld | |
| 7,068,817 B2 * | 6/2006 | Bourg et al. | 382/110 |
| 7,660,440 B2 * | 2/2010 | Bourg et al. | 382/110 |
| 8,284,248 B2 * | 10/2012 | Bourg et al. | 348/89 |
| 8,565,503 B2 * | 10/2013 | Eichhorn et al. | 382/128 |
| 2001/0048765 A1 | 12/2001 | Yi et al. | |
| 2004/0181302 A1 | 9/2004 | Schrader | |
| 2004/0197012 A1 * | 10/2004 | Bourg et al. | 382/110 |
| 2007/0153277 A1 | 7/2007 | Shakespeare et al. | |
| 2009/0056872 A1 | 3/2009 | Grove | |
| 2011/0050880 A1 * | 3/2011 | Bourg et al. | 348/89 |

OTHER PUBLICATIONS

PCT/US13/71498 Search Report and Written Opinion mailed May 12, 2014, 8 pages.

(Continued)

*Primary Examiner* — Katrina Fujita
(74) *Attorney, Agent, or Firm* — Colin P. Cahoon; Celina M. Orr; Carstens & Cahoon, LLP

(57) ABSTRACT

A method for scoring and controlling the quality of dynamic food products transitioning in the processing steps is performed using image analysis. An image of a plurality of moving food products on a conveyor system is captured by on-line vision equipment and image analysis is performed on the image via an algorithm that determines the percentage of pixels having varying intensities of colors and applies predetermined preferences to predict consumer dissatisfaction. The entire group of food products of one or more images is given an overall appearance score and each individual food product is also scored such that each may be ranked from least to more acceptable. The ranked food products can then be ejected in the order of worst to better rank to increase the overall quality score of the entire group.

20 Claims, 5 Drawing Sheets

(56) References Cited

OTHER PUBLICATIONS

MunsellStore.com, printed Mar. 21, 2013 and located at http://www.munsellstore.com/(X(1)S(5opipr45zxr54x555whmys21))/Default.aspx?gclid=CNOYj-id8LMCFQHNOgodBgkAlg&AspxAutoDetectCookieSupport=1.

PCT Search Report for PCT/US2013/071490 dated Apr. 18, 2014, 2 pages.

* cited by examiner

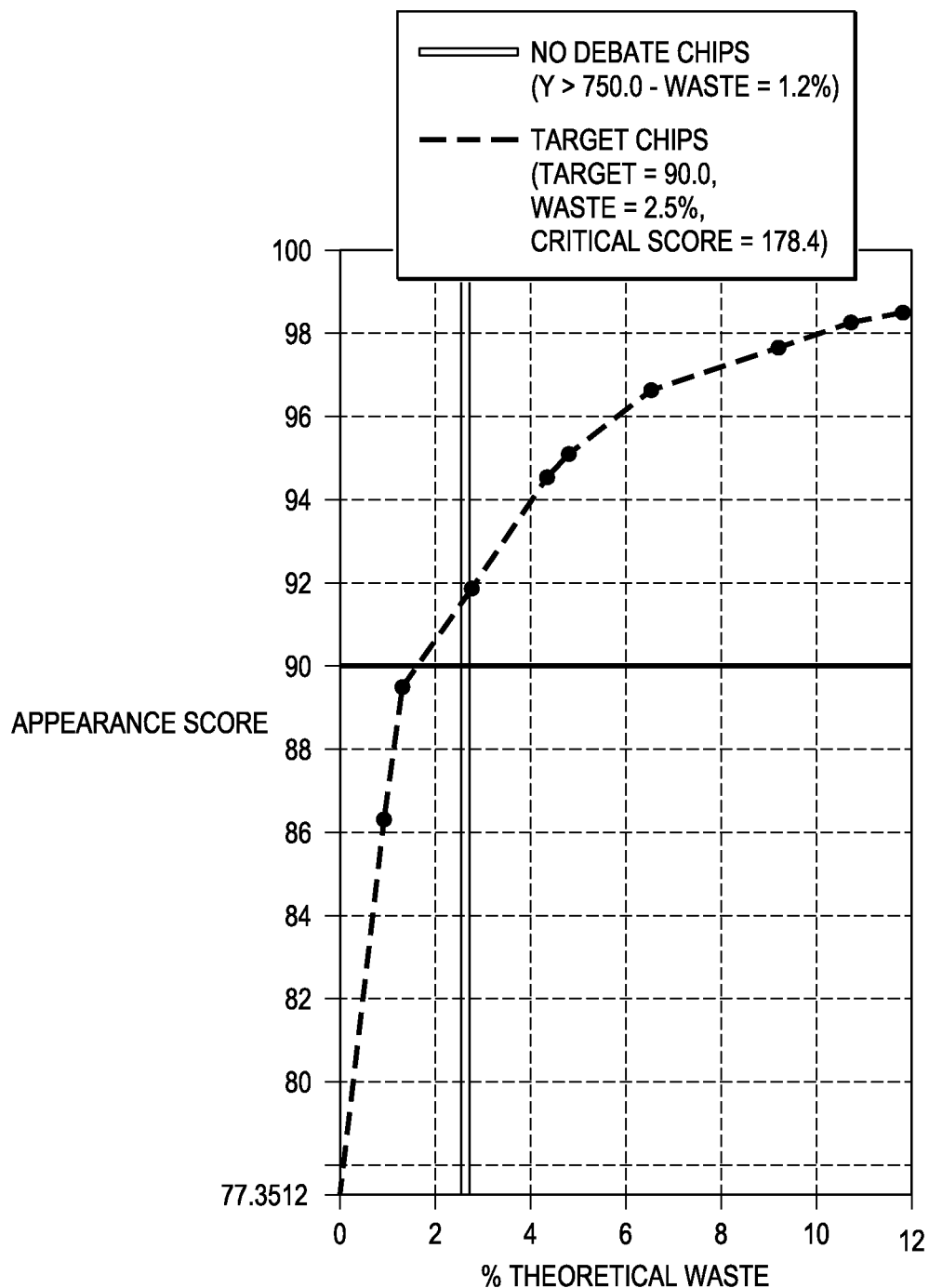

METHOD FOR SCORING AND CONTROLLING QUALITY OF FOOD PRODUCTS IN A DYNAMIC PRODUCTION LINE

BACKGROUND OF THE INVENTION

1. Technical Field

This invention relates to the field of quality control processes, and more specifically the use of image analysis in controlling overall quality of a dynamic production line.

2. Description of Related Art

A number of methods exist for analyzing the quality and sorting of food products transported on a conveyor belt. Such methods typically focus on sorting objects for the purpose of rejecting the objects having imperfections or defects and rejecting any foreign materials including non-edible parts of the food product. For example, manual efforts by people positioned along production lines and sorting by visual inspection as products pass along a conveyor belt provides one method of sorting or inspecting foods for quality control. Manual sorting is, however, costly and unreliable because of the inconsistent nature of human judgment by various individuals.

Computer vision and image analysis is an alternative and increasingly popular approach for automated, cost-effective methods for maintaining high and consistent quality standards. Computer vision systems are increasingly used in the food industry (including, for example, the grading or sorting of meats, grains, fish, pizza, cheese, or bread) for quality assurance purposes. Much of the literature on imaging analysis involves methods for altering the visual image in some way to make the image more visually appealing or to extract information on the shapes or boundaries of various observable features. In this vein, traditional image processes serve as automated, machine-vision systems performing operations many times faster and far more precisely than human observers or operators. Thus, such systems offer automated grading that can standardize techniques and eliminate tedious and inconsistent human inspection of product quality.

Among quality attributes, the coloring of a food product is of significance because consumers often use it as a basis for product selection or rejection. Color is one of the most significant inspection criteria used in the food industry in that the surface colorings of a food product may indicate the presence of defects or flaws in the food product. Such defects affect consumer acceptance or willingness to consume a product as well as point-of-sale value.

Color cameras are often used with machine or automated vision systems for image analysis systems or machine inspection of the quality of food products. But image analysis sorting methods of the food industry generally remain focused on sorting objects with the purpose of rejecting each product having any sort of defect, blemish, or otherwise visually unappealing characteristic. For example, existing sorting methods using image analysis in the production of food products sort out defective food products based on the degree of darkness and the size of the observed defect on the food product. In other words, most of the existing methods treat any defects as equal without regard for the relative area or intensity of the flaw or the size of a food product itself. Such sorting techniques result in higher amounts of wasted food product than might have been acceptable to consumers without compromising the overall perceived quality of the food. Efforts have been made to allow for sorting products based on the relative size of the defect compared to the total product surface area. Yet, even with these methods, the defect/rejection threshold is static and not adjusted for acceptability or preference factors while the products undergo quality inspection. This fails to account for the acceptability threshold per single item of the product in conjunction with the acceptability threshold for per batch, bag, or container.

Thus, it remains desirable to have sorting methods that not only sort food products potentially having defects but also evaluate the defects on the food products such that the amount of food products unnecessarily rejected or wasted is reduced. Such methods should take advantage of image analysis to provide reliable, objective, and cost-effective methods of producing food products while providing for nearly instantaneous monitoring and feedback control of the food products, especially when transitioning from one phase of assembly or preparation to another. Finally, such methods should also allow for quality control of food products to be ultimately packaged for consumption.

SUMMARY

The present disclosure provides methods for scoring and controlling quality of food products moving in a production line. One embodiment of the method include the steps of: (a) capturing an image of a plurality of moving food products; (b) performing image analysis on the image to determine varying intensities of at least one color; (c) scoring the plurality of moving food products as group based on a percentage of the color, thereby obtaining an overall appearance score; and (d) scoring each of individual food products based on image analysis applied to individual food product, thereby obtaining a plurality of individual quality scores In some embodiments, the method includes ranking each of the individual quality scores from least to most acceptable, and ejecting one or more individual food products based on a quality threshold to improve the group appearance score. In one embodiment, the ejecting step includes a step of sending a signal to downstream sorting equipment to reject an individually scored food product. In some embodiments, the quality threshold is changed based in part on the group appearance score. In addition, the individual quality score, which may be used to rank each individual food product from worst (or least desirable) to better (or more desirable) such that a product ranked worst can be ejected first, thereby improving the overall appearance score of the plurality of food products.

One embodiment of the methods described herein captures a plurality of images of moving food products and combines the images together to perform the imager analysis. The images are captured in the visible spectrum in one embodiment, while other embodiments capture images in the infrared or ultraviolet embodiments. Still, other embodiments use the florescence between the ultraviolet and the visible spectrum or between the visible and the near infrared spectrum to capture the images.

The image is pixelated into a plurality of pixels in some embodiments. The pixels are classified into at least to colors into at least two colors for the scoring step in some embodiments. In one embodiment, the pixels are further classified into two or more subclasses representing different levels of intensity of each color. In at least one embodiment, the pixels include varying intensities of red, green, and blue colors. In some embodiments, the classifying step includes determining the background pixels.

In another aspect of the invention, an apparatus for the monitoring defects in a dynamic food production system is disclosed. At least one embodiment of the apparatus includes an image capturing device; and a computing device capable of storing an algorithm, wherein a basis of the algorithm comprises preference threshold quantified based on visual perceptions of colored defects within food products. In on embodiment, the basis of the algorithm further comprises a ratio between an area comprising a defect and an area of a food piece. In another embodiment, the basis further includes determining a color intensity value for each pixel. In at least one embodiment, the image capturing device is a vision system capable of capturing a digital color image. In one embodiment, the computing device is further capable of pixelating an image captured by the image capturing device. The apparatus includes a sorter that is in communication with the computing device in one embodiment.

The methods described herein provide for the evaluation and sorting of food products based not only on the presence or size of a defect but also on the intensity and relative area of the type of defect in comparison with the size of the food product. In some embodiments, the methods differentiate between levels of defects partly based on consumer preferences or perceptions of the defect while taking into account the area and the type of the defect detected as undesirable. The present disclosure provides for a more objective and consistent basis for scoring food products while eliminating the amount of wasted food products. Methods presented herein also provide for determining the quality of food products while controlling the quality of food products that ultimately reach a consumer. Finally, the methods provide for a comparison of products to a desired product characteristic standard during a dynamic or moving production line at or near real-time.

Other aspects, embodiments and features of the invention will become apparent from the following detailed description of the invention when considered in conjunction with the accompanying drawings. The accompanying figures are schematic and are not intended to be drawn to scale. In the figures, each identical, or substantially similar component that is illustrated in various figures is represented by a single numeral or notation. For purposes of clarity, not every component is labeled in every figure. Nor is every component of each embodiment of the invention shown where illustration is not necessary to allow those of ordinary skill in the art to understand the invention.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

FIG. 5 illustrates a theoretical waste curve for determining and controlling the overall appearance score of a plurality of fried potato chips according to one embodiment.

DETAILED DESCRIPTION

Traditional image analysis methods are known in the art with respect to a variety of applications in the food industry, such as fruit and vegetable sorting, automatic partitioning, inspection for foreign matter of objects, and general packaging applications. But digital imaging applications pertaining to quality control in the form of the improved scoring of the overall appearance of a plurality of food products as a group has yet to be seen.

The method described herein provides for the scoring and quality control of a plurality of food products to be packaged. The scoring includes steps for determining the individual quality scores of each individual manufactured food product in a captured image using image analysis techniques. The term "quality" as used herein refers to the first impression of the visual aspects of a food product. A quality score is given according to its appearance (including the color(s), perceived defect, and relative size of a perceived defect) to determine the visual attractiveness of a cooked food product.

Figure 1A:
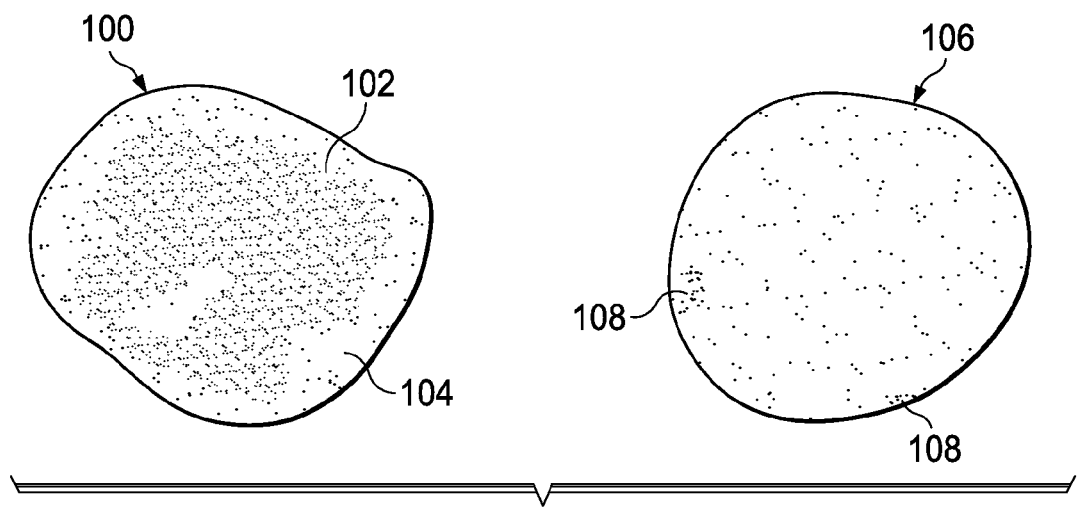
FIGS. 1A and 1B illustrate examples of prior art methods of rejecting cooked potato chip products.
Figure 1B:
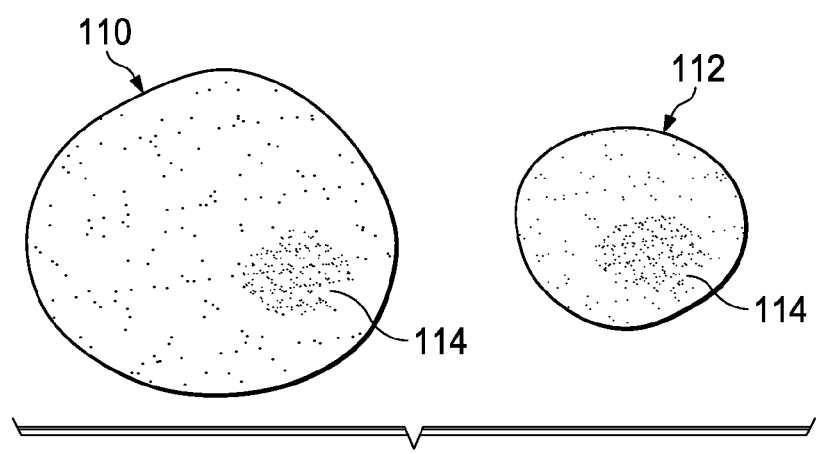

The methods disclosed here provide for minimized waste where a food product, though containing a small defect, is not unnecessarily discarded due to a mere presence of the defect. Rather, the methods allow for the relative size of the defect in addition to the type of defect to be taken into account and while doing so, the methods provide for controlling the quality of the product ultimately distributed to consumers. FIGS. 1A and 1B depict previously used methods of scoring using computer and vision analysis, for example, where two potato chip products are scored or graded equally although visually it can be seen that one product is more acceptable than the second. In FIG. 1A, the chip product 100 is of substantially equal size to the chip product 106. But chip product 100 contains a number of discolorations 102 throughout that are generally visually unappealing for consumption purposes. In other words, the more acceptable coloring of the chip (e.g., yellow) at 104 in the chip product 100 is barely visible as compared to the chip product 106 to the right that is mostly yellow with only a few flaws at 108. Previously used image analysis methods would treat both products the same by giving them the same quality score, although in terms of the relative size of the defect, product 100 is more acceptable than product 106. In other words, previous visual imaging analysis systems treat most defects based on the size/area of the defects independent of the overall chips size, resulting in the overly aggressive removal or ejection of large chips having any type of defects. Similarly, in FIG. 1B, the two chip products 110, 112 are actually different sizes but comprise approximately the same size defect 114. While the larger of the two chip products would obtain a better quality score than the smaller chip if based on the area of the total chip relative to the area of the defect region, both chips would still be targeted for removal from the product stream in previous methods because of a similar overly aggressive sorting system. Thus, previous methods fail to address either the type of defect or the relative area of the defect.

The present method is only provides a plurality of food products with quality scores such that the particular and relative levels of defects are taken into account but also improves upon and controls the overall group appearance scores of products to be further processed and ultimately packaged into a single bag or container to be distributed for consumption. In addition, the method enables the prioritization of defects according to the visual perceptions.

Figure 2:
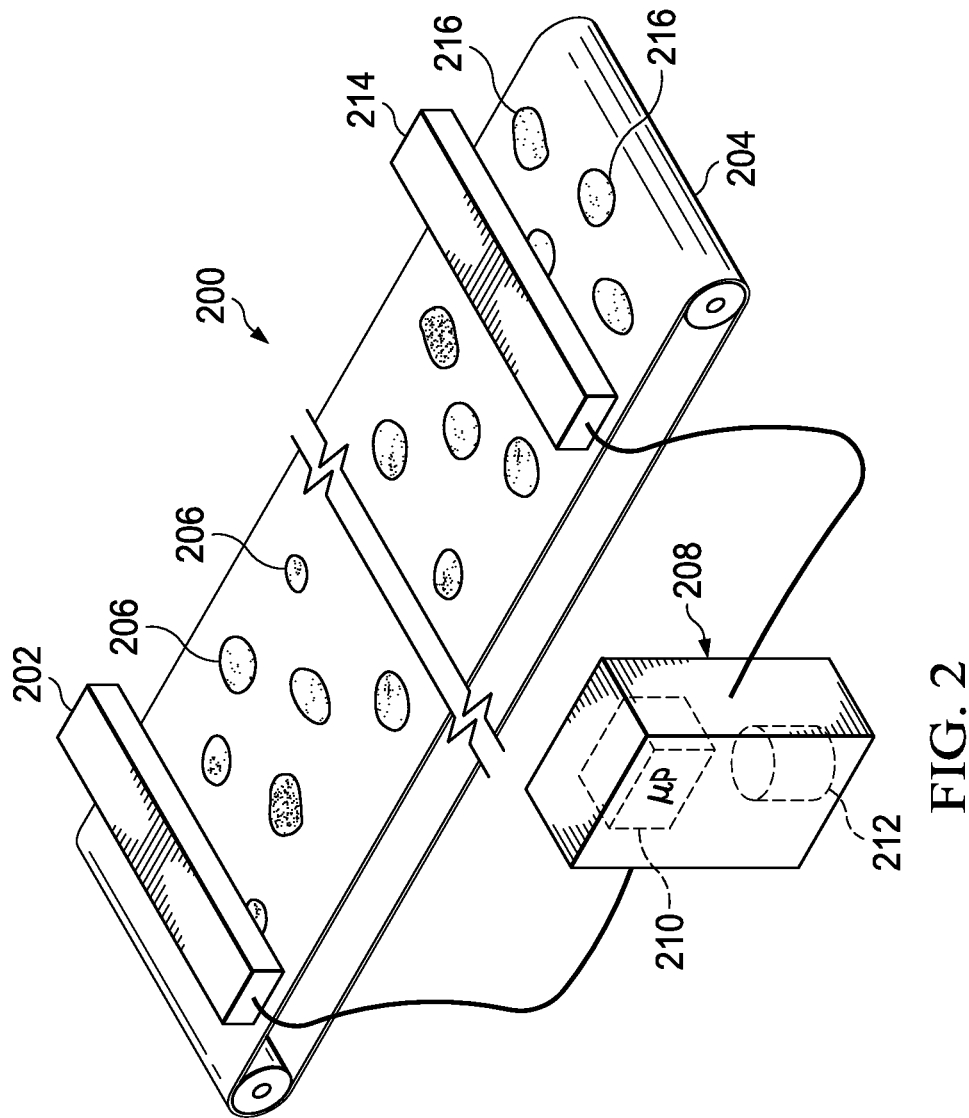
FIG. 2 illustrates a system for scoring and controlling food product quality in dynamic production line according to one embodiment.

FIG. 2 illustrates one embodiment of a system capable of performing the disclosed method. System 200 includes an image capturing device 202. In some embodiments, the image capturing device 202 is positioned above a conveyor system 204 that is transporting food products 206 to be sorted. The conveyor system 204 is in communication with a computing system 208 in at least some embodiments. The computing system 208 includes a microprocessor 210 and a memory 212. The computing system 208 is in further communication with a sorting system 214 capable of sorting our food products that fall below a certain quality standard. In at least one embodiment, a typical set up for using imaging technology in a food manufacturing environment includes a camera or other image capturing device, illumination, an image capture board (frame grabber or digitizer), and a computing device 208. In one embodiment, microprocessor 210 is interfaced with memory 212, which contains one or more computer programs or software for the processing of image data. The computing device 208 receives data from the image capturing device 202 via a wired or a wireless transmission device in one embodiment. In some embodiments, the computing device 208 further includes a central processing unit (CPU) and is interfaced to an output device such as a screen or printer to which it transmits results of the data processing. Results of the data processing may also be written to a file in the program storage device. The computing device 208 includes not only standard desktop computing devices but may encompass any system capable of storing information and executing program commands.

In one embodiment, the sorting equipment 214 is located downstream from the image capturing device 202 and includes a bank of movable air nozzles that can reject or eject the least acceptable food product with the worst quality score before the chips are packaged. The sorting equipment 214 may then further reject the next least acceptable food product, or the individual food product having the next worst quality score, in order to continue improving upon the overall appearance score of the plurality of food products travelling on the conveyor system 204. It should be noted that system 200 as depicted in FIG. 2 is merely illustrative of the concept; it does not represent nor suggest limitations on size, proportion, location, or arrangement of any of the components.

Figure 3:
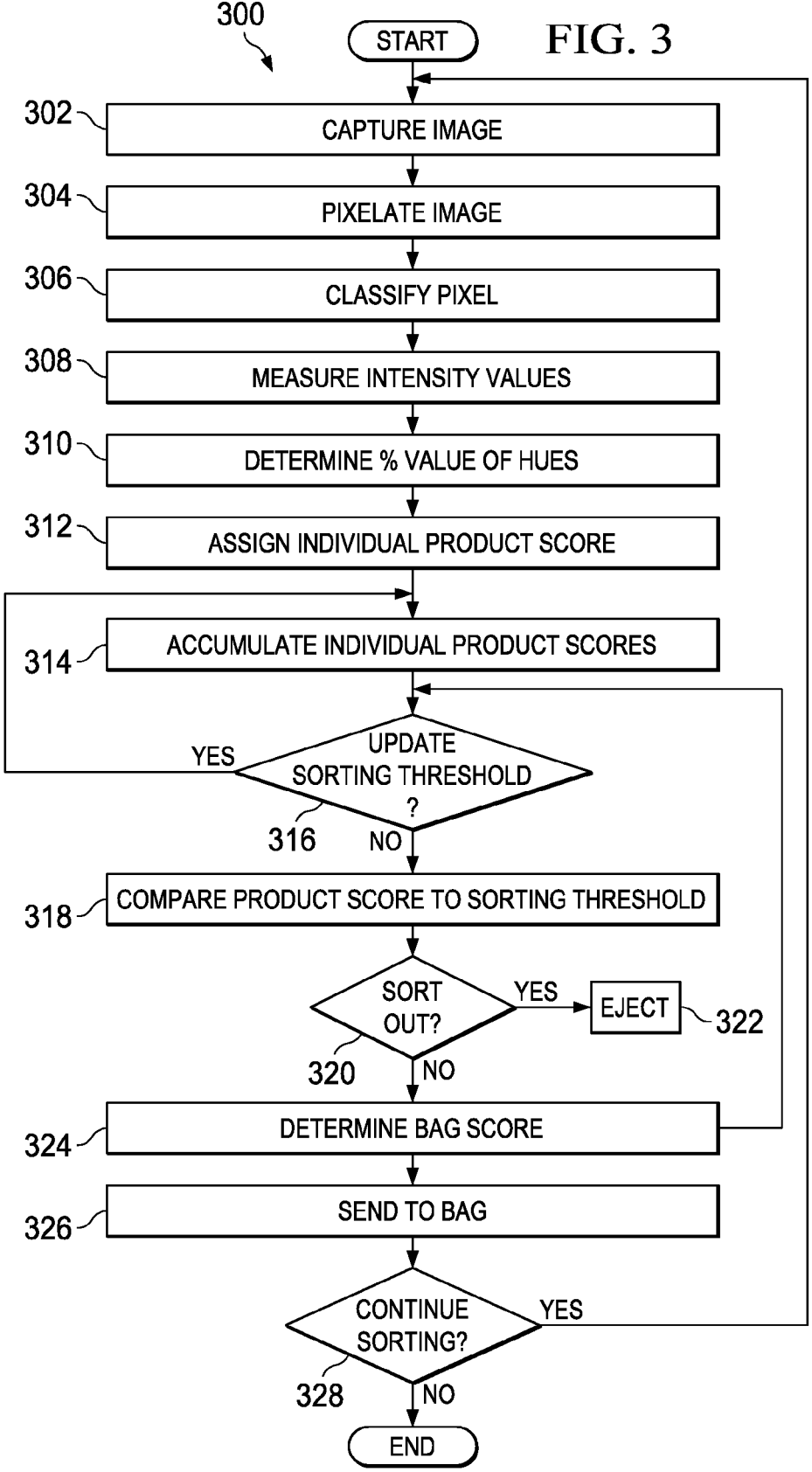
FIG. 3 illustrates an overall flow chart of the present method according to one embodiment.
Figure 4:
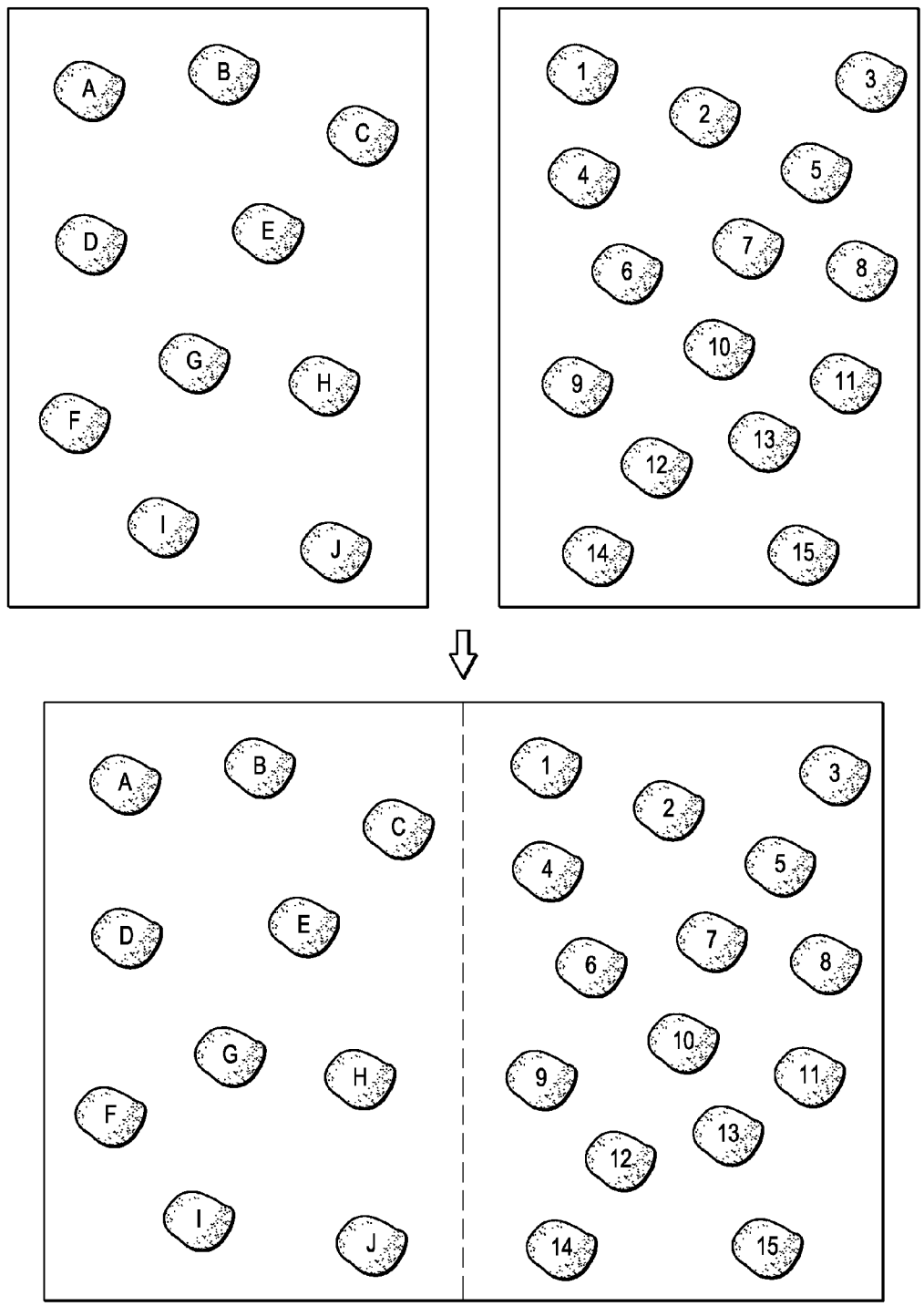
FIG. 4 illustrates an accumulation of digital images according to one embodiment.

Referring now to FIG. 3, the overall general method 300 for scoring and controlling the quality or appearance is presented. To inspect and acquire data from the products, at step 302, an image is first captured of the food products by an image capturing device 202. At least in some embodiments, the image is captured of moving food products as they proceed down a dynamic processing line. In one embodiment, food products are conveyed via a moving conveyor system 204 to subsequent operations such as seasoning or packaging. In one embodiment, the food products are finish-fried and in the process of transitioning on the conveyor system 204 from a frying stage to further processing steps. In one embodiment, the food products are placed in a monolayered configuration by any means known in the art. For example, bedded food products can be placed into monolayered configuration by transferring bedded food product from a first conveyor belt to a much faster moving second conveyor belt. In one embodiment, the entire width of a conveyor system 204 upon which the products are set is imaged thereby providing maximum inspection and analysis of the surface of a plurality of food products. Conveyor speeds typically average about 600 feet per minute. Consequently, in one embodiment, a sequence of images is captured such that the sequence can later be combined together for analysis of the entire group, batch, or lot of product passing through or under the image capturing device. The results from each individual image are combined to give results for the overall group of images as if they were all one sample, as shown in FIG. 4. The data from each image is combined as if it were one large image according to methods known well in the art.

In some embodiments, the image capturing device 202 includes an image analysis system. The image analysis system may be of any type of imaging system known to those skilled in the art, including without limitation a vision system, ultraviolet-visible-near infrared imager (or any combination thereof), x-ray imager, thermal imager, acoustic/ultrasonic imager, microwave imager, or any other imaging technology that operates in the electromagnetic spectrum from ultra-low frequency (below the audible range) through sub-nanometer wavelengths. In one embodiment, the image is captured in the visible spectrum, which encompasses the wavelength range of about 400 nm to about 700 nm, by on-line vision equipment consisting of a camera. For example, a stationary line scan color charge-coupled-device (CCD) camera mounted above the conveyor system 204 may be used in capturing the visible spectrum. Such camera performs a succession of line scans to form a two-dimensional array of pixels representing a two-dimensional image, measuring the intensity level of each pixel along a line. An electromagnetic radiation source could also be configured to emit radiation from various bands of the electromagnetic spectrum, including but not limited to the infrared spectrum and ultraviolet spectrum, and could also be configured to emit single and multiple wavelengths of electromagnetic radiation in the desired spectrum. Thus, in another embodiment, the image is captured in the near-infrared spectrum (about 800 nm to about 2500 nm). Image analysis outside the visible spectrum can be beneficial, for example, in detecting defects not visible at the surface or detecting moisture or nutrient content. In another embodiment, the image is captured in the ultraviolet spectrum (about 10 nm to about 400 nm). Accordingly, it should be understood that the image may be captured in a range of predetermined wavelengths, not limited to the visible spectrum. For convenience, the method described herein for working with manufactured snack foods is most easily carried out in the visible spectrum using three color channels, namely red, green, and blue. But it will be understood that using the visible spectrum may not be appropriate in other applications. In some embodiments, the snack food is illuminated with visible light to obtain the image of a product of the process. In other embodiments, the product is illuminated with one wavelength of radiation to observe the response in a different region. For example, illumination using ultraviolet irradiation may result in responses in the visible region (e.g., in fluorescence) based on specific characteristics of the feature (or defect) of interest.

Returning to the discussion of FIG. 3, after an image is captured by an imaging device 202 at step 302, it is transferred in substantially real-time to the computing device 208 for image analysis. Such transfer may be wired or wireless transfer, or any other method capable of transferring data. The image is captured in a form that is meaningful to a computer or data processor. In one embodiment, such a form is the image represented by a series or array of numbers. This is typically done by pixelating the image at step 304. As used herein, pixelating means dividing the image into a two-dimensional grid of a number of discrete picture elements or pixels. In some embodiments, a frame grabber or a digitizer performs the pixilation step 304. Thus, after an image is captured at step 302, it is pixelated, segmented, or digitized at step 304 such that a computer or data processor can obtain information or data from the image. Each pixel has an associated color value, representing the hue and intensity of that portion of the images which corresponds to the pixel.

In one embodiment, the method 300 utilizes color camera systems to record intensities for at least two different colors. In one embodiment, each image consists of an image array of pixel elements of measured intensity values in at least three wavelength ranges defining the dimensions for the image array. While one approach may be to use a multi-spectral image (in this case RGB), in other embodiments, the method applied also applies to mono-spectral images (e.g., black and white, x-ray, ultrasonic, etc.). Three different color ranges, designated as red, green, and blue are typically used. Thus, a single color value in a color camera system might be specified by three or more discrete variables or intensity values r, g, and b, corresponding to intensities of red, green and blue. The color of each pixel in the image has varying intensities of the colors red, green and blue and is characterized by the numerical values (for example, integers from 0 to 255) of its red, green and blue channels. It should be noted that the camera should be calibrated before acquiring images and at regular intervals thereafter.

Following the pixelating step 304, the pixels are then classified into two or more classifications at step 306. In one embodiment, classifying of pixels is subdivided into more than one classifying step, e.g., foreground extraction followed by acceptability analysis. First, because the products are travelling upon a substantially monochrome conveyor belt, the pixels are classified into either background or food product such that the background (e.g., exposed surfaces of the conveyor belt) upon which the products are photographed is distinguished from the products. Several approaches are known in the art for separating foreground from background. For example, if the background has a high contrast with against the objects being analyzed, simple thresholding can be used. Generally, any method of distinguishing background from the food products known in the art may be used with the method described herein. For example, in one embodiment, multivariate image analysis known as Principle Component Analysis (PCA) (as described in U.S. Pat. No. 7,068,817 issued to Bourg, et al.) is applied to the image to distinguish the background. In another embodiment, a Simple Interactive Object Extraction (SIOX) is applied to extract the foreground or the object of interest from the background.

Once the pixels are classified as belonging to a color that is identifiable as a food product, the pixels are then classified into either acceptable food product or potentially unacceptable food product. Pixel classification is often used in quality control applications in the food industry to distinguish between acceptable and defective products. Acceptable food products, for example, will comprise a coloring that is akin to one or several predetermined acceptable colorings. Potentially unacceptable food product as used herein is meant to refer to a food product having of one or more defects on the surface of the food product, where a defect is represented by a color other than a predetermined acceptable color. Such defects may refer to one or more of several predetermined unacceptable colorings in the visible spectrum. For example, U.S. Pat. No. 5,335,293 issued to Vannelli and assigned to Key Technology, Inc., discloses a method of classifying pixels and pixel color values according to component types, defined as an area of the product representing a single quality classification such as "acceptable" product, "white defect" product, "brown defect" product, or another classification depending on the nature of the product. For example, a product such as a green bean is segmented into two classes (type I and type II) according to the differences in the color values of each individual pixel. Component types may also exist for "background," and "unidentified" areas. Vannelli's system uses color training method to identify defects, i.e., an individual human operator trains the system what is considered a defect color versus acceptable color among the product stream. The sortation is then achieved based on comparative evaluation of observed colors compared to trained colors that are identified by individual operator interaction with the system. In such a system, sortation system is dependent on dynamic operation with individual operators as a function of the input stream of product. In contrast, in some embodiments, the defect threshold is calculated is based on both the percent area of defect further weighted by preference factors.

In addition to specific colors that are segregated by RGB content of individual pixels, other features such as gradients of color change in either X, Y, or both X and Y directions simultaneously. Also specific identifying features of individual types of defects—such as specific color sequences in X, Y, or both X and Y directions simultaneously—can be used to distinguish other than acceptable colorings in the visible color spectrum. These types of features are relevant in that they broaden the field of application and obviate the color calibration step often needed in the application of vision technology to metrological applications.

In some embodiments, once an image of a food product is classified as a potentially unacceptable food product, the pixels are then further classified into two or more groups representing the type of defects on the surface of the food product. In one embodiment, the groups correspond to the more common types of coloring defects found on the surface of the food products. In one embodiment, the pixels of potentially unacceptable food products are further classified into two or more sublevels of intensity for each coloring defect detected.

By way of example, in the case of cooked potato chips, acceptable potato chips may comprise one or more hues or shades of yellow coloring while potentially unacceptable potato chips may comprise one or more shades or levels of green, brown, or black. Thus, each possible color value is classified as one of a plurality of component types, defined as an area of the product representing a single quality classification such as acceptable color or specific level of defective color. In one embodiment, the United States Standards for Grades of Potatoes for Chipping (the Standards) issued by the U.S. Department of Agriculture (USDA) is used to define acceptable versus defective color. For example, the Standards indicate that unless otherwise specified, the color index of the composite sample of fried chips shall be not less than a reading of 25 on a USDA-approved photoelectric colorimeter (Agtron M-30A or M-300 A) or it may be based on one or more of the color designations with corresponding colorimeter indices (Agtron M-30A or M-300A) specified in Table 1 below:

TABLE 1

| Color Designations | Agtron Index Range |
| --- | --- |
| 1 | 65 and higher |
| 2 | 55 to 64 |
| 3 | 45 to 54 |
| 4 | 35 to 44 |
| 5 | 25 to 34 |

Following classification of the pixels based on product/background and defect color at step 306, each pixel having one or more detected defect colors are classified based on their intensity values or levels at step 308. In determining the intensity values at step 308, the pixels are first counted to determine the number of pixels classified as one of the predetermined or preset categories or levels.

The percentage values of each hue detected are then determined at step 310 to provide the food products in the image with an individual product score at step 312. In some embodiments, the individual product score is calculated by multiplying each of the percentage values by a predetermined coefficient. In one embodiment, the coefficient takes into account a factor by which a consumer is more likely to forgive the defective coloring. For example, the most commonly recurring types of defects can be targeted for evaluation using consumer scores or ratings given to each type of defect. In most embodiments, at least one type of defects is evaluated for ranking or scoring. In another embodiment, three or more defects can be used for evaluation. In the case of cooked potato chips, for example, consumers may rate their willingness to eat chips having shades of one or more defects on the chip surfaces (e.g., green, black, or brown). Conversely, consumer may also rate their unwillingness to consume chip products having such defects. Each defect can then be given a specific coefficient ranking the undesirability (or desirability) to forgive or consume the colored defect. Such coefficients can then be incorporated into an algorithm to be programmed into a processing unit for real-time calculations or scores. Essentially, such calculation allows for the prediction of consumer dissatisfaction based on the percentage or number of pixels showing defects, which correlate to the defective colorings on the surface of the food products. Additionally, in some embodiments, the same algorithm can be applied to individual chips and the overall grade calculated by summing the scores based on a weighted chip size. In other embodiments, the preference coefficients are determined by quality assurance considerations independent of consumer preferences.

The use of color intensity values, percent value of hues, and preference factors or coefficients in the algorithm can be more readily understood in the form of matrix mathematics. For example, in an embodiment where a pixel is classified according to the colors red, green, and blue and further classified according to intensity value categories of low, medium, and high, such data can be compactly represented as a 3×3 matrix:

$$\begin{bmatrix} a & d & g \\ b & e & h \\ c & f & i \end{bmatrix}$$

wherein the columns represent colors (RGB) and the row represent the intensity values. The matrix can further be manipulated by multiplying with a coefficient or another matrix that represents preference factors to yield a weighted pixel data. One advantage of using matrices is efficiency in calculation and the ability to assign a single number (such as the determinant of the matrix) to be represent the pixel. That single number for the pixel can easily be accumulated to render an individual product score or a group appearance score.

In alternative embodiments, the columns or rows of the matrices represent other quality factors besides colors. For example, in embodiments where nonvisible spectrum analysis is carried out at steps 302 and 304, the columns of the matrix could represent moisture level, density, or porosity. In yet other embodiments, other quality factors include amount of certain chemical elements or compounds. It is within the scope of this disclosure to combine image capturing devices spanning various ranges of the electromagnetic spectrum to yield a plurality of matrices for a single pixel.

Referring back to FIG. 3, once individual product scores are assigned at step 312, system 200 accumulates these scores in the memory 212 at step 314. In other embodiments, both the matrices data and the calculated scores are accumulated at step 314. In at least some embodiments, the method 300 begins with a generic sorting threshold that is preset independent of the food product stream being sorted. At step 316, system 200 determines whether to update the sorting threshold. If system 200 decides not to update the threshold at 314, the method 300 continues on to the subsequent steps using the preset threshold. If system 200 decides to update the threshold, the method 300 cycles back to step 314 and continues to accumulate the individual product scores. The decision to update the sorting threshold is based in part on subsequent calculations of the group appearance or "bag" score (at step 324) and whether it is desirable to increase the group appearance score of the bag or batch.

The time period during which the system 200 accumulates the data can be adjusted according to need. In one embodiment, a predetermined time interval (e.g., 3 minutes) is provided. In other embodiments, the accumulation period is adjusted based on the cumulative quality score or the amount of changes or deviation detected in the food product stream. In such embodiments, once the quality scores of initial sets of individual food products are determined, system 200 dynamically adjusts the sorting threshold at step 316 based at least in part on the batch being sorted. This is referred to as contextual sorting, which can be distinguished from previous sorting methods that focused solely on sorting out any and all products that contained pixels representing defects. This contextual sorting may be advantageous in reducing over-sorting and needless wastage of food products. Furthermore, the automated, digital system with a feedback loop can sort a high volume of products autonomously without the need for a human operator.

At step 318, computing device 208 compares the sorting threshold to individual product scores. During the initial cycle of the method 300, the individual product scores are compared with a preset, generic sorting threshold that is preset independent of the food product stream being sorted. During the subsequent cycles after the sorting threshold is updated at step 316, system 200 compares the individual product score with the updated sorting threshold at step 318.

Based on the comparison at step 318, the system 200 decides at step 320 whether to sort out an individual food product based on if it is desirable to improve upon the group appearance or bag score. If determined in the negative at step 320, the individual food product is grouped with products to be bagged or packaged at step 326, and its individual product score is aggregated with other non-ejected product scores to determine the bag score at step 324. If determined in the affirmative at step 320, a signal is sent to the sorting equipment 214 downstream so the individually ranked food products will be ejected at step 322 beginning with the least desirable product, (or the product having the worst quality score).

In one embodiment, rejected or worst ranked food products are deflected from the conveyor carrying the product with a stream of air from an air nozzle in step prior to a packaging step. In another embodiment, the rejected food products are deflected onto another portion of the conveyor belt such that they may pass through the camera for additional inspection before being ultimately discarded. In one embodiment, system 200 ejects and discards food products that fall below a "no-debate" threshold without further inspection. FIG. 5 illustrates an example of how a no-debate threshold is determined based on the theoretical waste curve. In such an example, any individual product having a score below the no-debate threshold (indicated by the double bar) would be ejected at step 322.

Once food products have been sorted out at steps 320 and 322, system 200 determines a group appearance or bag score of sorted products 216 at step 324. Though bag score can mean the aggregate score of products in a container or bag, the aggregate score can be calculated on per-batch basis of desired size. If the group appearance score is below an acceptable level, the sorting threshold is updated (i.e., the method 300 cycles back to step 316 to update the sorting threshold) to sort more aggressively (e.g., sort out the individual product having a least desirable score) and thereby increase the overall score. One advantage of using an aggregate score on per-bag basis is to ensure that consumers can expect a consistent product quality from one bag to another. The sorted products 216 are optionally sent to packaging system to be packaged in bags at step 326. At step 328, system 200 determines whether to continue the sorting process. If affirmative, the method 300 loops back to step 302 and continues to capture images. If negative, the method 300 terminates.

The present invention is best explained with reference to a potato chip production line with certain coloring defects that may occur in potato chips fried to a moisture content of less than about 3%. Such coloring defects may be problematic because they adversely affect the willingness of a consumer to accept or ingest the food product, resulting in decreased consumer satisfaction.

Potato slices are cooked in a continuous fryer at, for example, a temperature of about 340° F. to about 360° F. for approximately 3 minutes. The cooked potato chips exit the fryer and proceed along a conveyor at approximately 480 to 600 feet per minute. A visible spectrum lighting system and a RGB camera system are mounted above the conveyor belt. A digital camera captures a color image of the plurality of chips as they proceed down the conveyor and images of the products are sent to a computer for analysis using methods disclosed herein. A line scan CCD camera, for example, may be a proprietary Key Technology RGB 3 CCD line-scan camera powered by either a direct current (e.g., a battery) or alternating current drawn from an electrical outlet. The RGB signal generated by the camera is fed to an image digitizing board in the CPU, which may be a commercially available server-class computer running software under Microsoft Windows, UNIX, LINUX, or Macintosh operating systems. The digitizing board grabs an image of the moving food products and the image is saved for analysis. In at least some embodiments, the images are passed from the initial frame grabber computer via a network protocol and shared disk drive technology. The image is sent to the computing device, which is programmed to determine pixel values and compare the colors of the pixels with predetermined acceptable and defective values.

During test runs, following identification of background pixels, yellow hues predetermined as acceptable food product were determined so as to distinguish from potentially unacceptable food products. Red, green, and blue pixel intensity values were then mapped to one of nine possible hues; that is, three sublevels each (extreme, medium or slight) of black, brown and green. It should be noted that while test runs evaluated three colors, the analysis may be performed on only one color, if only one defect is the preferred target. The pixels were then counted for each of the possible hues and a percentage area of each relative to the size of the chip is calculated. The algorithm, which is developed as described above and programmed into the computing device, then provides a group appearance score for the plurality of chips in the image and also scores each individual chip in the image. For example, Table 2 below illustrates a simple sample calculation of percentage areas of each color defect to predict a group appearance score.

TABLE 2

| COLOR DEFECT | BLACK | BROWN | GREEN |
|---|---|---|---|
| PERCENT AREA - LINE 1 | 0.3 | 0.63 | 0.8 |
| PERCENT AREA - LINE 2 | 0.5 | 0.3 | 0.15 |
| PERCENT AREA - LINE 3 | 0.02 | 0.1 | 0.3 |

Generally, higher percentage areas of the specific color defect indicate more dislike by a consumer. The group score can then be calculated by multiplying predetermined consumer coefficients a, b, and c by the determined percent areas of the colored pixels in the table. For example, as follows:

$$\text{Group Appearance Score} = (0.3)a + (0.63)b + (0.8)c$$

The line scan data and calculations can be accumulated to determine the individual quality scores of each chip. One such example is illustrated as shown in Table 3 below:

TABLE 3

| | Good | Pixel Counts | | | Percentages | | | Consumer Weight | | | Quality | |
| | Chip | Brown | Black | Green | Brown | Black | Green | Brown | Black | Green | Index | Rank |
|---|---|---|---|---|---|---|---|---|---|---|---|---|
| Chip # | | | | | | | | | | | | |
| 1 | 8499 | 405 | 36 | 23 | 4.52 | 0.40 | 0.26 | 1 | 2 | 3 | 6.1 | 3 |
| 2 | 2121 | 80 | 0 | 22 | 3.60 | 0.00 | 0.99 | 1 | 2 | 3 | 6.6 | 4 |
| 3 | 1145 | 365 | 0 | 6 | 24.08 | 0.00 | 0.40 | 1 | 2 | 3 | 25.3 | 10 |
| 4 | 7312 | 110 | 28 | 57 | 1.47 | 0.37 | 0.76 | 1 | 2 | 3 | 4.5 | 2 |
| 5 | 1659 | 274 | 28 | 2 | 13.96 | 1.43 | 0.10 | 1 | 2 | 3 | 17.1 | 8 |
| 6 | 2939 | 245 | 0 | 5 | 7.68 | 0.00 | 0.16 | 1 | 2 | 3 | 8.2 | 5 |
| 7 | 2778 | 96 | 0 | 6 | 3.33 | 0.00 | 0.21 | 1 | 2 | 3 | 4.0 | 1 |
| 8 | 4709 | 199 | 316 | 55 | 3.77 | 5.99 | 1.04 | 1 | 2 | 3 | 18.9 | 9 |
| 9 | 10602 | 327 | 185 | 193 | 2.89 | 1.64 | 1.71 | 1 | 2 | 3 | 11.3 | 7 |
| 10 | 5114 | 371 | 1 | 51 | 6.70 | 0.02 | 0.92 | 1 | 2 | 3 | 9.5 | 6 |
| Total | 46878 | 2472 | 594 | 420 | 4.91 | 1.18 | 0.83 | 1 | 2 | 3 | N/A | N/A |

The processing unit then determines a theoretical waste curve as depicted by way of example at FIG. 4. The waste curve depicts an overall appearance score for the plurality of chips beginning at about 77 (see plot at 77.3512). As each of the chips has been given an individual product score, to improve the overall appearance or bag score, the chip having the worst product score is first ejected. As depicted in the graph of FIG. 4, removal of this first worst scoring chip improves the appearance score to about 86. Thus, the dashed line shows a curving to the right from about 77 up to about 86. If it is desired to continue to increase the appearance score, the chip having the second worst product score can be targeted. As shown by the third plot moving to the right of the dashed theoretical waste curve, this improves the appearance score yet again; this time, to just below about 90. Removal of the chip having the third worst product score results in another shift to the right along the theoretical waste curve to about 92. Similarly, as the fourth through ninth chips in the ranks are ejected, additional plots show the curve nearing an appearance score of 100. With the increased group appearance score, however, comes an increase in theoretical waste. Thus, to minimize waste, it may be more desirable to balance group appearance score with theoretical waste to achieve a desired result.

When it is determined that a chip is to be ejected to improve upon the overall appearance score of the plurality of chips to be packaged, the sorter, consisting of a bank of air nozzles, is signaled by the image analysis system that a defective chip is approaching within certain distance or time. The sorting equipment then rejects the defective chip by hitting it with a blast of air and deflecting it from the conveyor. In this manner, the sorter removes the most egregious defects from the dynamic stream based on predetermined or programmed criteria.

In one embodiment, the sorting equipment is located a short distance (e.g., less than about 10 feet downstream from the vision equipment. Therefore, in such embodiment, if the food product is moving along the conveyor at speeds upward of 600 feet per minute, the image analysis and determination of whether a chip is to be ejected to increase the overall quality of the plurality of chips must take place very quickly. To accomplish this, an algorithm is programmed into a silicon chip that is connected with the vision equipment and sorting equipment. In an alternative embodiment, the algorithm is programmed into the sorting computer. Since the computation time is significantly fast (e.g., on the order of micro- to milliseconds), the method can be used as an online measurement device and integrated into a control system that allows measurement of varying colored pixels and scoring of the food products to occur in less than about 1 second.

Though the present invention has been described with reference to color defects in a potato chip production line, it is to be understood that the invention is applicable to other defects (such as blisters, shapes, holes, burn marks, or spots) and other thermally processed food products (such as tortilla chips, extruded snacks, popped snacks, puffed grains, breakfasts cereals, nuts, or meat snacks). The examples and explanations given are not meant to limit the present invention.

The sorting methods described herein can be used for continuous, in-line inspection at full production speeds of between about 0 to about 1000 feet per minute, or they can be used in a batch-feed mode. As previously described, cameras for capturing images for subsequent analysis can be used to inspect within the visible range (e.g., red, green, and blue) or infrared (IR) or ultraviolet (UV) spectrums, or combinations thereof.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example and illustration only.

What is claimed is:

1. A method for scoring and controlling quality of a plurality of moving food products, the method comprising the steps of:
   capturing an image of a plurality of moving food products;
   performing image analysis on the image to determine varying intensities of at least one color;
   scoring the plurality of moving food products as a group based on a percentage of the color, thereby obtaining an overall calculated group appearance score; and
   scoring each individual food product based on image analysis applied to individual food product, thereby obtaining a plurality of individual product scores.

2. The method of claim 1 further comprising the steps of:
   ranking each of the individual food products according to individual product score; and
   ejecting one or more of the individual food products based on a quality threshold to improve the group appearance score, wherein the individual food product having the worst product score is first ejected.

3. The method of claim 2 wherein the ejecting step comprises sending a signal to downstream sorting equipment to reject an individually scored food product.

4. The method of claim 2 wherein the quality threshold is changed based in part on the group appearance score.

5. The method of claim 1 wherein the capturing step comprises sequentially capturing a plurality of images of the plurality of moving food products and combining the plurality of images together prior to perform the image analysis.

6. The method of claim 1 wherein the image is captured in the visible spectrum.

7. The method of claim 1 wherein the image is captured in the near infrared spectrum.

8. The method of claim 1 wherein the image is captured in the ultraviolet spectrum.

9. The method of claim 1 wherein the image is captured using fluorescence between ultraviolet and visible spectrum.

10. The method of claim 1 wherein the image is captured using fluorescence between visible and near infrared spectrum.

11. The method of claim 1 wherein the image analysis comprises pixelating the image into a plurality of pixels and classifying each pixel into the at least two colors for the subsequent scoring step.

12. The method of claim 11 further comprising classifying each pixel into two or more subclasses representing different levels of intensity of each color.

13. The method of claim 11 wherein the pixels comprise varying intensities of red, green, and blue.

14. The method of claim 11 wherein classifying the pixels further comprises determining a plurality of background pixels.

15. An apparatus for the monitoring defects in a dynamic food production system comprising:
   an image capturing device; and
   a central processing unit having an algorithm programmed therein, wherein a basis of the algorithm comprises preference threshold quantified based on visual perceptions of colored defects within food products and an overall calculated group appearance score, wherein said colored defects are predetermined colorings in the visible spectrum.

16. The apparatus of claim 15 wherein the basis further comprises a ratio between an area comprising a defect and an area of a food piece.

17. The apparatus of claim 15 wherein the basis further comprises determining a color intensity value for each pixel.

18. The apparatus of claim 15 wherein the imaging capturing device is a camera.

19. The apparatus of claim 15 wherein the computing device is further operable to pixelate an image captured by the image capturing device.

20. The apparatus of claim 15 further comprising a sorter wherein the sorter is in communication with the computing device.

* * * * *